Figure 1:
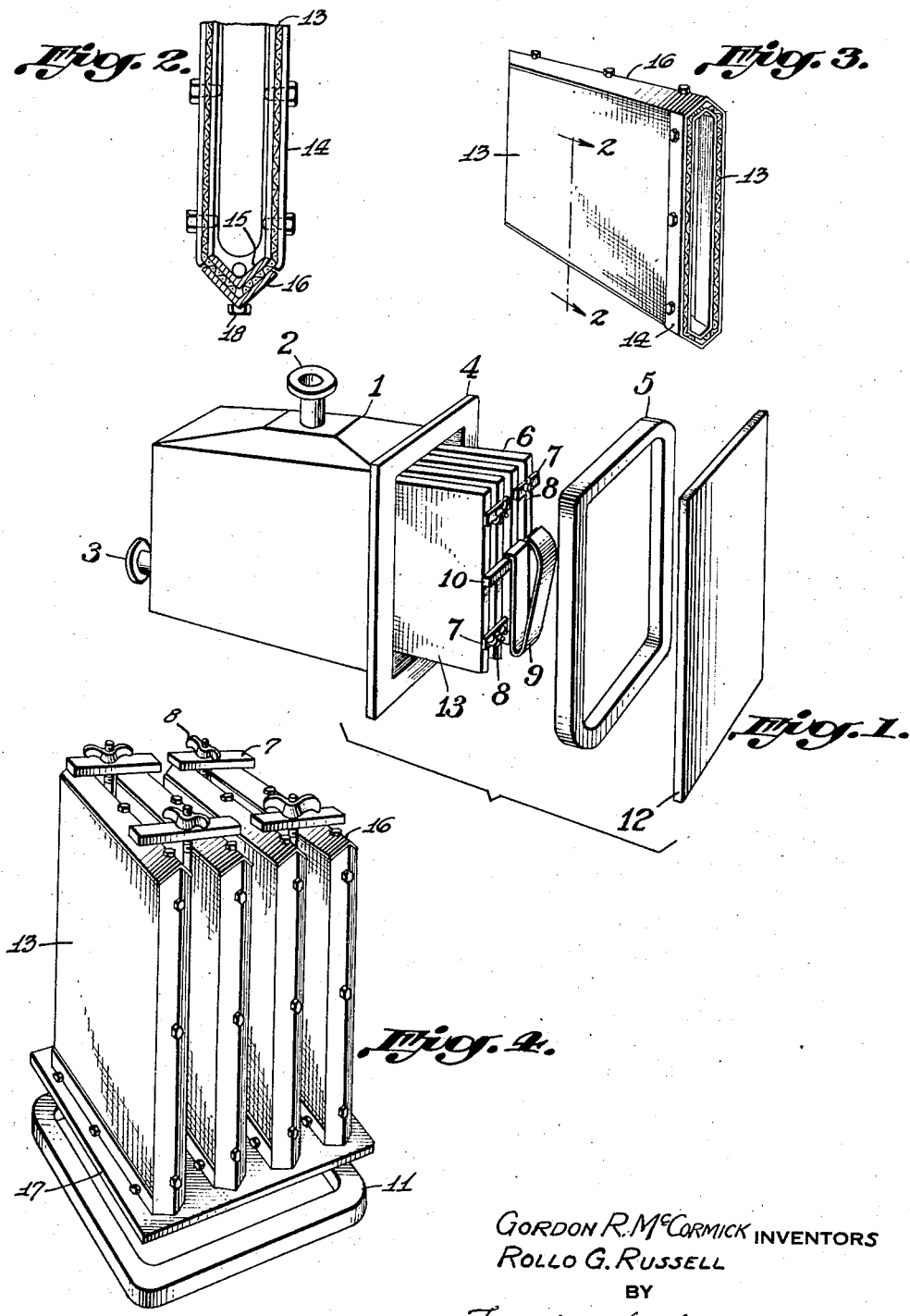

July 16, 1940.  G. R. McCORMICK ET AL  2,208,135
FILTERING DEVICE
Filed Nov. 16, 1938  3 Sheets-Sheet 1

GORDON R. McCORMICK INVENTORS
ROLLO G. RUSSELL
BY
Frank C Hilberg ATTORNEY

July 16, 1940.   G. R. McCORMICK ET AL   2,208,135
FILTERING DEVICE
Filed Nov. 16, 1938   3 Sheets-Sheet 2

GORDON R. McCORMICK INVENTORS
ROLLO G. RUSSELL
BY
Frank C Hilberg ATTORNEY

July 16, 1940.  G. R. McCORMICK ET AL  2,208,135
FILTERING DEVICE
Filed Nov. 16, 1938    3 Sheets-Sheet 3
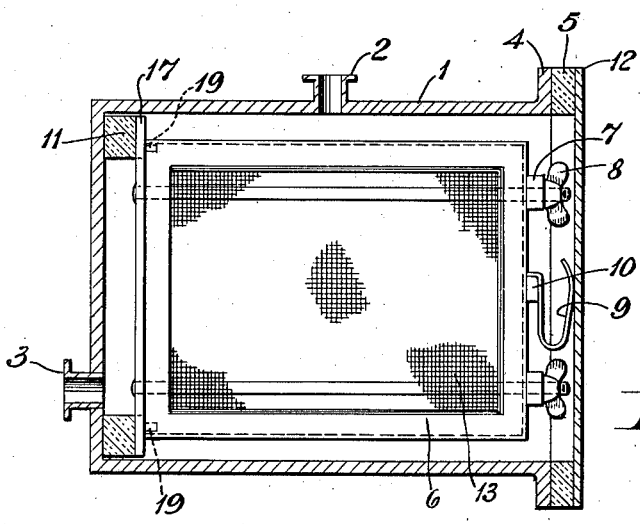
Fig. 5
Fig. 5A
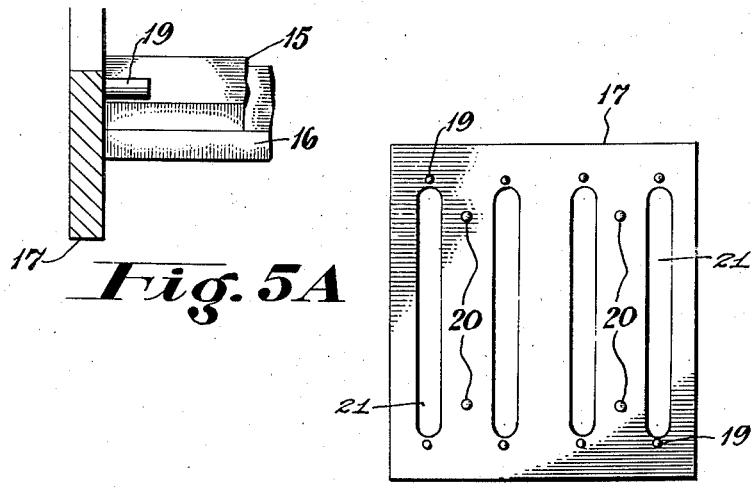
Fig. 6
GORDON R. McCORMICK
ROLLO G. RUSSELL    INVENTORS
BY Frank C. Hilberg   ATTORNEY Patented July 16, 1940

2,208,135

UNITED STATES PATENT OFFICE 2,208,135

FILTERING DEVICE

Gordon R. McCormick and Rollo G. Russell, Flint, Mich., assignors to E. I. du Pont de Nemours & Company, Wilmington, Del., a corporation of Delaware Application November 16, 1938, Serial No. 240,649

2 Claims. (Cl. 210—181)

This invention relates to an apparatus for removing sand, dirt, hair, and other foreign material from liquids and relates more particularly to a device for screening foreign matter from liquids which may be passed through the device at a high rate of speed.

In the preparation of paints, enamels, lacquers, finger nail polishes, liquid cements, furniture polishes, thinners, and the like, it often happens that a small amount of sand, grit, splinters of wood, coarse particles of pigment, and other objectionable material finds its way into the manufactured product. This must be removed since it would have a deleterious effect on the use to which the liquid is put subsequently; for example, a small amount of sand in a furniture polish would produce scratches and probably leave the finish in a poorer condition than before the polish was applied. Likewise in the spraying of paints, enamels, and lacquers, a few particles of pigment agglomerates would give the finish a very undesirable appearance and may necessitate the refinishing of the object to which the coating composition had been applied. Therefore, the present invention is particularly suitable for screening coarse particles from such liquids.

Many devices are on the market which accomplish a purpose similar to that for which the herein disclosed apparatus has been designed. However, they are usually very cumbersome and are not easily moved from one position to another.

It is, therefore, an object of this invention to provide an apparatus for filtering relatively coarse particles from liquids very rapidly. It is also an object of the present invention to provide an apparatus which not only accomplishes this purpose but is simple, light in weight, and one which may be produced at a relatively low cost.

A further object of this invention is the provision of a device which occupies a minimum of space and may be carried from one location to another without the use of a truck. A still further object is the provision of a device in which screens of standard width may be used and can be cut from a roll without waste.

These objects are accomplished by the present apparatus in which a housing provided with an inlet and an outlet for the liquids to be filtered has a unit made up of a plurality of frames on each side of which are clamped suitable screens so that as the liquid passes through the housing, it must also pass through one of the screens in the unit. It will be apparent from the following description that a relatively small housing will accommodate an extremely large area of screen for filtering the liquids.

Figures 2, 3:
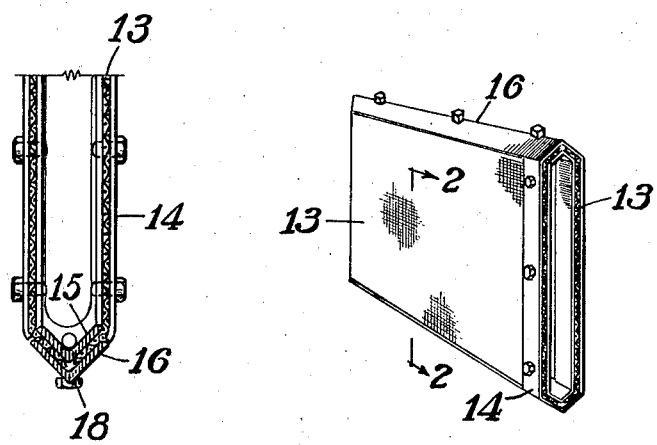
Figure 4:
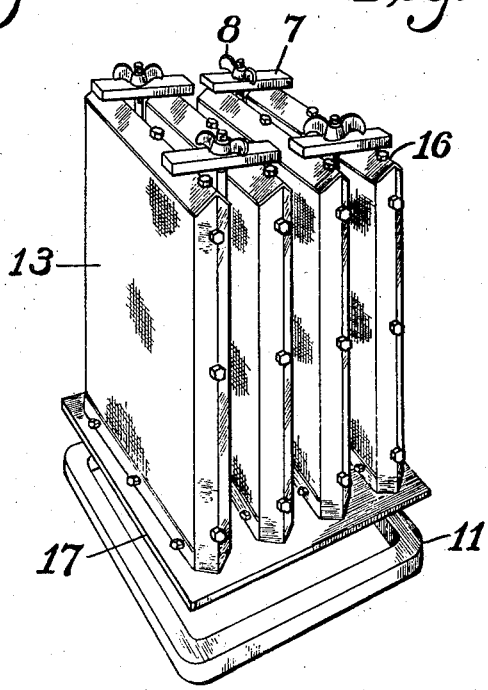

In the drawings, Figure 1 is a diagrammatic side elevation showing the housing, a portion of the filtering unit, a gasket and an end plate. Figure 2 is a detailed partial section along the line 2—2 of Figure 3. Figure 3 is a plan view of one section of the screen assembly. Figure 4 is a plan view of the entire unit in which four sections are used. Figure 5 is a section through Figure 1; Figure 5—A is an enlarged section of the lower left-hand corner of Figure 5 showing the arrangement of the parts; Figure 6 is a plan view of the end plate 17. In all figures the same characters refer to the same parts.

In Figure 1 the housing is indicated as 1 and is provided with an inlet 2 and an outlet 3. The housing is also provided with a flange 4 and a gasket 5. This gasket has the same general shape as the flange 4. A cover 12 is also provided which is held in place by means of clamps (not shown) or other means such as those commonly used on autoclaves. The unit which actually does the filtering may be made up in any number of sections. In Figure 1, four are shown. The sections are made up of a rectangular frame the edges of which are made into the form of a right isosceles triangle instead of a flat side. The end opposite that which contacts plate 17 is likewise of this form.

In Figure 2 the frame of angle iron is shown as 15; over this frame is spread the wire screen 13. This is usually bought in standard widths, and the frame is made of such a size that it will accept this width without waste. Over the four edges of the wire fabric 13 are metal strips 14 and angle iron 16 which clamp the wire fabric and angle iron 16 is held in place by means of bolts 18. The filter unit may be held in place against the plate 17 by means of long bolts having a cross member 7 and a wing nut 8 as shown in Figure 4. The plate 17 may be recessed or provided with a pin to hold the frame in place. After the filter unit has been provided with screens, it is ready for insertion in the housing. In order to avoid leakage around the outlet, the end plate 17 is provided with a gasket 11. The unit is then inserted in the housing and held in place by means of a spring 9 and a cross member 10. The cover 12 and gasket 5 are put in place and secured by means of clamps. In Figure 5, 19 is an aligning pin which is secured to plate 17 and registers in the vertex of the angle iron 15 as shown in Figure 2. In Figure 6 the pins are likewise shown as 19, and the holes through which the filtered liquid passes is designated as 21. The plate 17 is held in close contact with the unit shown in Figure 3 by means of bolts which pass through holes 20 in the plate 17.

In the operation of the apparatus the liquid enters through the inlet 2 which may be under any reasonable amount of pressure. It then flows around the filter screens and fills the entire housing. Any air which may be entrapped can be liberated by means of a pet-cock in the upper side of the housing (not shown). The liquid passes through the screen on the sides of the filter sections and out through the outlet shown opposite the end provided with the cover. The liquid passes out of the unit through the outlet 3 and may be collected in any convenient manner or may be passed through another filter of similar design having filter cloth or other finer filtering medium instead of the screen 13. It is to be understood that the inlet may also be located in the bottom or top as well as on any of the sides.

The advantages of the present invention are that the apparatus occupies a minimum of space and may be taken down and set up in a very few minutes. Another advantage is that the filtering surface is extremely large with relation to the space occupied by the entire apparatus. A still further advantage is that the device uses wire cloth of a standard size without any waste and does not depend on soldering for securing the wire cloth in place. A still further advantage is that the entire apparatus is relatively light and may be carried by one man, whereas most filtering devices of the prior art having the same filtering surface would require a truck to move it about.

It is apparent that many widely different embodiments of this invention may be made without departing from the spirit and scope thereof, and therefore, it is not intended to be limited except as indicated in the appended claims.

We claim:

1. An apparatus for filtering liquids which comprises a closed fluid tight housing provided with an inlet and an outlet and a filtering device within the said housing comprising a frame having rectangular sides, the distance between the said sides being small with respect to the length of the edges of the frame, each side of the said frame having a screen extending over it and removable clamps on three edges of the periphery of the frame for clamping the said screen to the said frame, and means for fastening the remaining edge against a plate having a hole within the area defined by the ends of the screen and the clamps, and means for holding the said plate against the outlet of the filter housing whereby liquid may pass through the screen, through the hole in the plate, and thereafter through the said outlet.

2. A filtering device comprising a filter unit and a fluid tight housing about the said unit, the housing comprising an inlet and an outlet and a gasket around the outlet, said unit comprising a plate provided with a plurality of elongated holes and a plurality of frames adapted to make a fluid tight fit around each of the said holes, the frames being provided with clamping means about their edges, and a screen on each side of the said frames extending over the edges thereof and under the said clamping means, and means for tightening the same to the frames whereby the liquid to be filtered cannot pass unfiltered between the screen and the frame, and means for holding the said filtering unit tightly against the said gasket whereby the liquid to be filtered must enter the housing, pass through the screens and out the said holes and through the outlet of the said housing.

GORDON R. McCORMICK.
ROLLO G. RUSSELL.